K. A. SODERSTROM.
PROCESS OF MANUFACTURING PIPE FITTINGS AND ANALOGOUS ARTICLES.
APPLICATION FILED MAR 26, 1920.
1,406,693.
Patented Feb. 14, 1922.
4 SHEETS—SHEET 1.
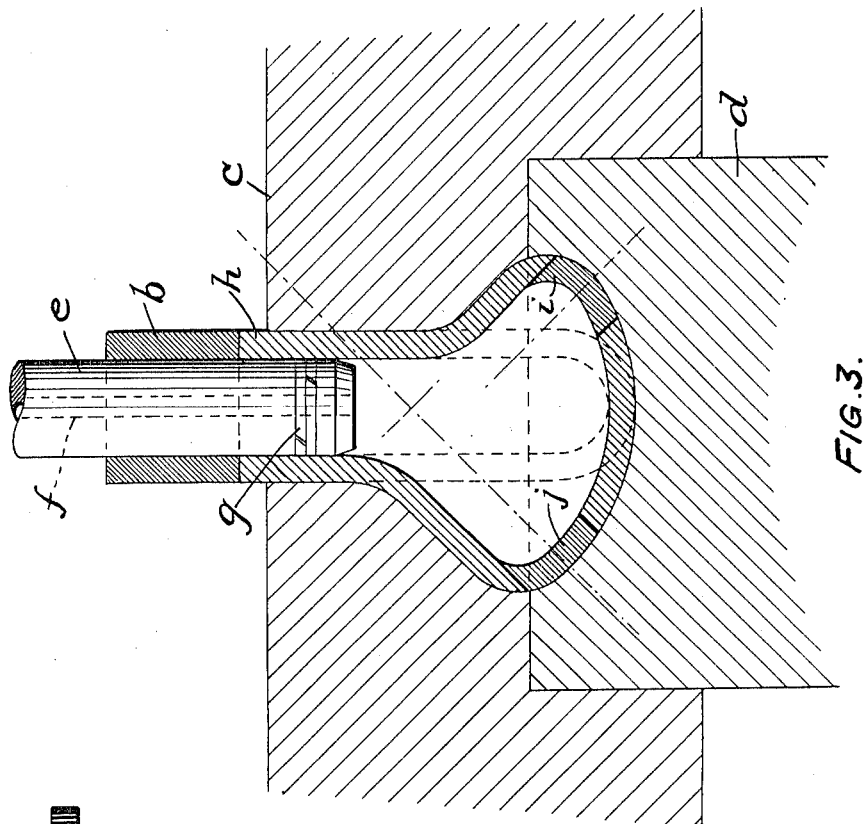
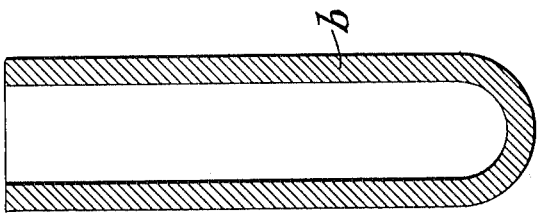
WITNESS:
Rob't M Mitchel
INVENTOR
Karl A. Soderstrom
BY
Frank S. Busser
ATTORNEY.

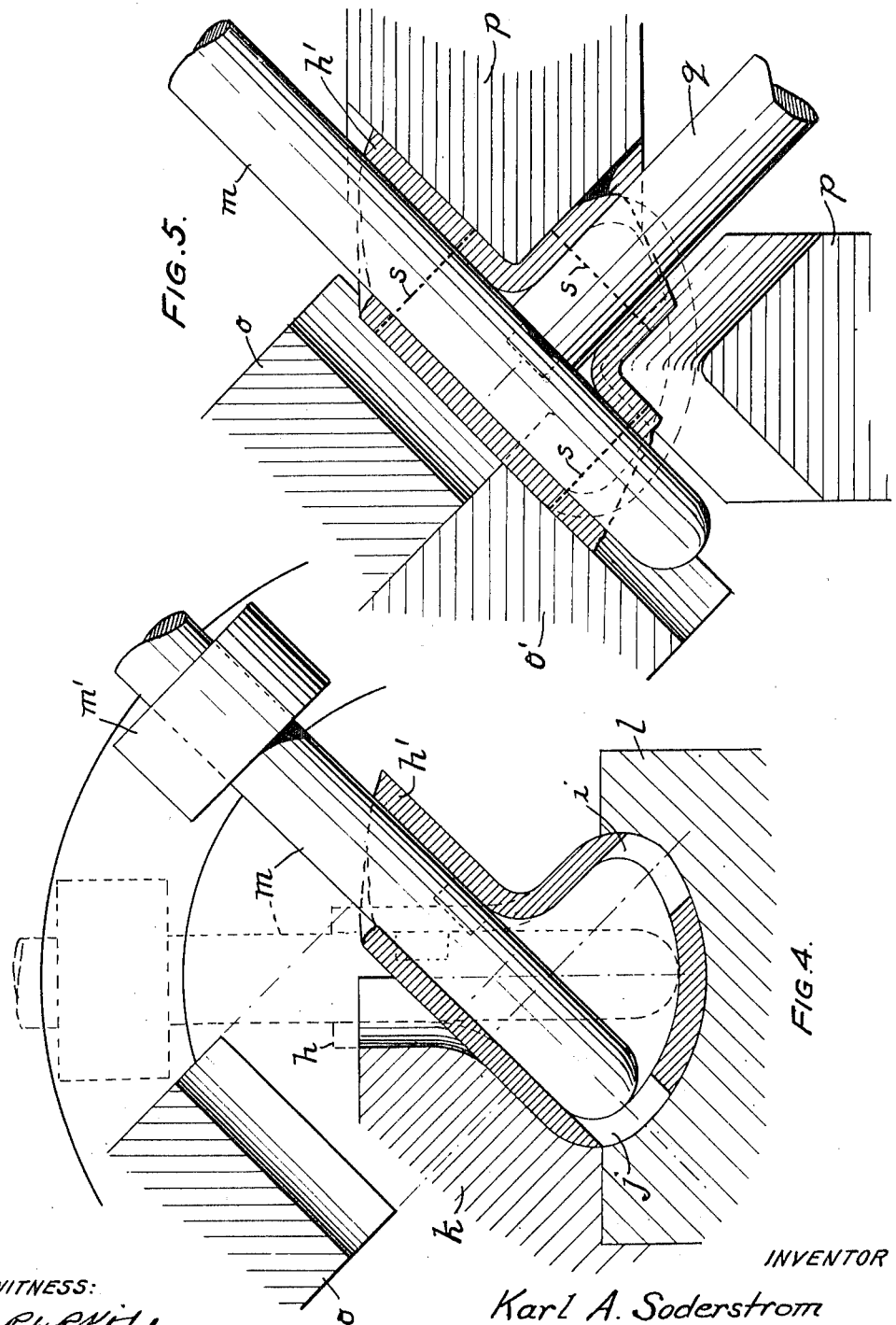

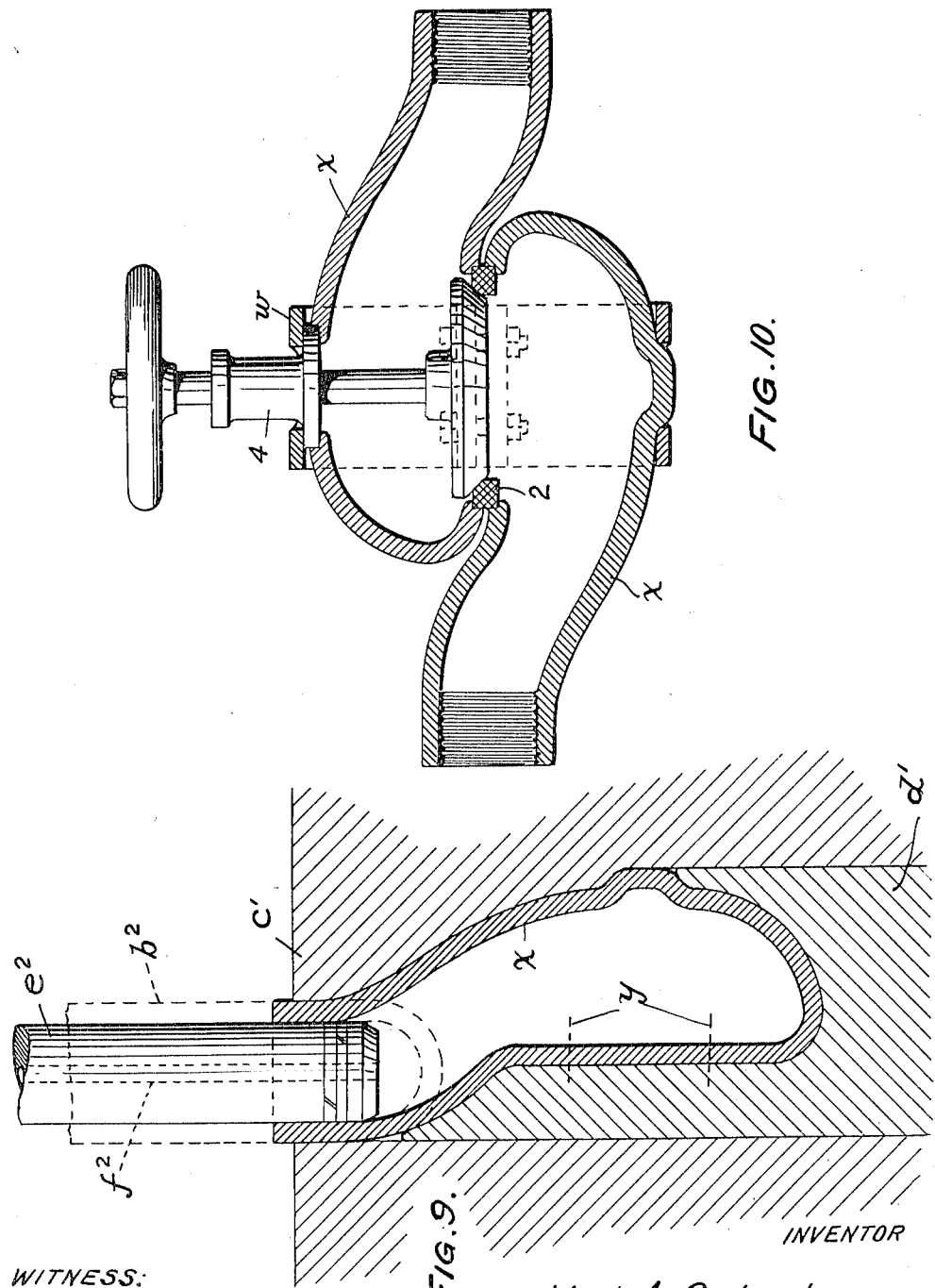

UNITED STATES PATENT OFFICE.

KARL A. SODERSTROM, OF PHILADELPHIA, PENNSYLVANIA.

PROCESS OF MANUFACTURING PIPE FITTINGS AND ANALOGOUS ARTICLES.

1,406,693.  Specification of Letters Patent.  Patented Feb. 14, 1922.

Application filed March 26, 1920. Serial No. 369,144.

*To all whom it may concern:*

Be it known that I, KARL A. SODERSTROM, a citizen of the United States, residing at Philadelphia, county of Philadelphia, and State of Pennsylvania, have invented a new and useful Improvement in Processes of Manufacturing Pipe Fittings and Analogous Articles, of which the following is a full, clear, and exact description, reference being had to the accompanying drawings, which form a part of this specification.

My invention relates to a novel method of manufacturing pipe fittings, valve bodies and the like, and has for its object the production of such articles from flat plates of metal, which are preferably rolled, in such manner that the articles produced will be entirely seamless and in every way superior to the present welded or cast articles of similar type.

By the use of my novel method of manufacture, the cost of production is reduced, due to a saving in time and labor and to the fact that the weight of metal used may be kept at a minimum. Further, at each step the fittings are subjected to a most thorough test as to their ductility and lack of flaws.

I will now proceed to describe the operation of my process, with reference to the accompanying drawings, in which,—

Fig. 1 is an edge view of a circular metal disc of rolled metal.

Fig. 2 is a sectional view of a tube drawn from the disc shown in Figure 1.

Fig. 3 is a sectional view of a partially formed T fitting in a die.

Fig. 4 is a sectional view of the partially formed T in a further stage, showing means for forming.

Fig. 5 is a sectional view of the T in its final stage, with final forming dies.

Fig. 9 is a sectional view of a half valve body in its forming dies.

Fig. 10 is a sectional view of a completed valve formed from two of the half bodies shown in Figure 9.

Referring more particularly to Figures 1 to 6 inclusive, in which is illustrated the various steps in the formation of a T fitting; A circular disc $a$, preferably of rolled metal, is drawn into the form of a cylindrical shell $b$ of an outside diameter equal to the desired diameter of the finished T, in any well known manner. The shell $b$ is then placed in a forming die $c$ the interior surface of which is concaved to the external curve of the T and having the same inside diameter in transverse section as the outside diameter of the shell. The die is provided with a removable bottom portion $d$. A plunger $e$, provided with a central bore $f$, is inserted into the shell and packed as at $g$. The plunger should be inserted a sufficient distance to insure that the packing is backed by the forming die $c$. The bore $f$ of the plunger $e$ is connected with a suitable source of hydraulic pressure and sufficient pressure is admitted to the shell to overcome the elastic limit of the metal, causing the shell to expand and fill the die, forming the blank $h$. The blank $h$ is removed from the forming die, after the bottom portion $d$ has been dropped out, and two holes $i$ and $j$, of a size equal to the inside diameter of the finished T, are drilled in line with the respective axes of two bores of the T.

The blank $h$ is then placed in a holding die $k$ having a removable bottom portion $l$ and a mandrel $m$ inserted in its neck, as indicated in dotted lines, Figure 4. The mandrel $m$ is swung over, until the mandrel is opposite the hole $j$, and bends the neck of the blank to form one leg of the T, as shown at $h'$. Mandrel $m$ is provided with a guide roll $m'$ to insure its swinging in proper manner.

Figure 6:
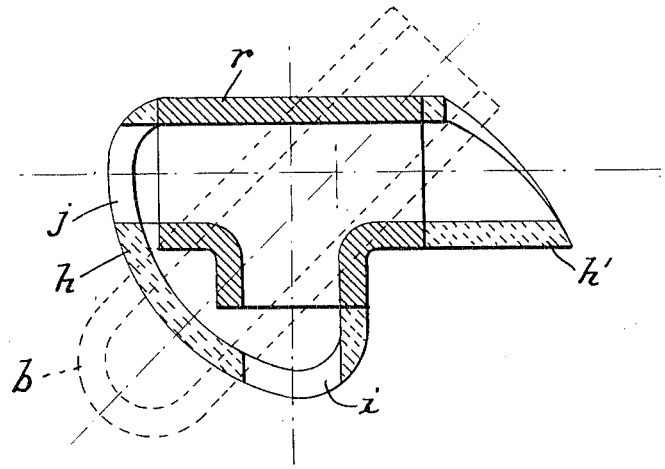
Fig. 6 is a diagrammatic view of the steps in forming a T fitting from the tube shown in Figure 2.

The blank is then placed between straight dies $o$, $o'$, having concave faces to conform to the curve of the outer surface of the body of the T, and angular dies $p$, $p'$, having concave faces. The mandrel $m$ is advanced to extend through hole $j$ and a second mandrel $q$ inserted through hole $i$. The dies are then closed in and the T $r$ finally formed. After removal from the dies, and removal of the mandrels, the ends of the legs are cut off square, as indicated by the lines $s$, Fig. 5, and the T threaded for use. Reference to Figure 6 discloses the various forms assumed by the disc $a$ in the formation of the T.

Figures 7, 8:
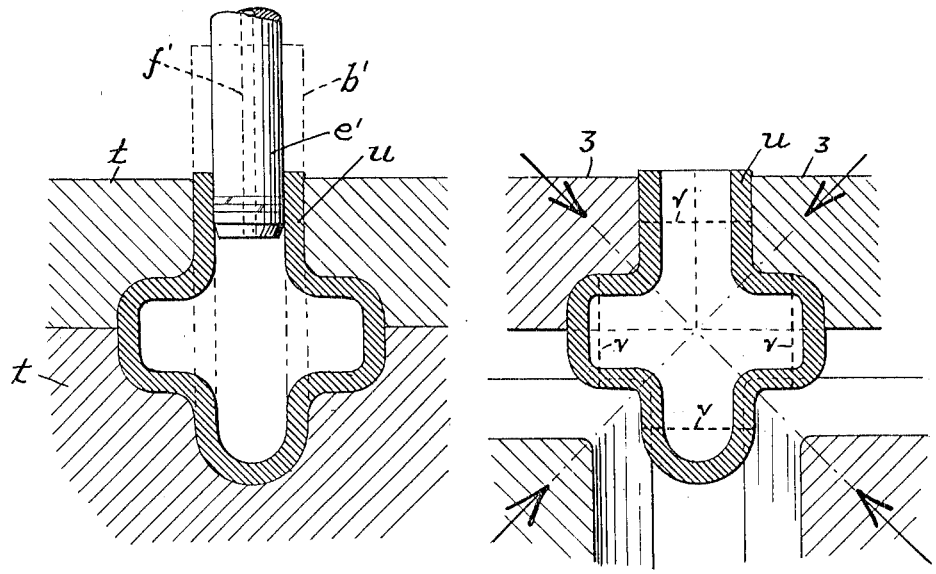
Fig. 7 is a sectional view of a cross being formed in dies.
Fig. 8 is a sectional view showing a further step in the formation of the cross.

Referring to Figures 7 and 8 in which is illustrated the formation of a cross fitting: The cylindrical shell $b'$ is placed between a pair of forming dies $t, t$, having concave internal surfaces and of a diameter in transverse section equal to the outside diameter of the fitting. The plunger $e'$, having a central bore $f'$, is inserted into the neck of the shell and packed as shown. Hydraulic pressure is then put on the shell through the plunger which expands the shell causing it to fill the die and form the blank $u$. The partly formed cross $u$ is then placed in final forming dies 3, which press it on diagonal lines Figure 8. After the blank $u$ is removed from the forming dies, the ends of the arms are cut off square as indicated by the lines $v$, Figure 8, and the cross fitting threaded for use.

Referring now to Figures 9 and 10 in which I have illustrated the formation of a valve body: The cylindrical shell $b^2$ is inserted in a forming die $c'$ having a removable bottom portion $d'$. A plunger $e^2$ having a central bore $f^2$ is inserted in the shell and packed as usual and hydraulic pressure put on the shell. The shell is expanded and fills the die, forming the half casing blank $x$, which is cut out on lines $y$ to form the half casing $x$, which is opposed to a similar half casing, through the valve seat 2, and secured by means of a clamp $w$, to form a complete valve casing. One of the half casings is bored, in alignment with the valve seat, to admit the usual valve operating mechanism 4, as shown in Figure 10.

In the above description of the process involving my invention, I have considered the cylindrical shell $b$ as having walls of uniform thickness. However, it will be obvious, in the formation of a T for example, that the shell may be readily so drawn from the disc $a$ that the walls will be of unequal thickness, so that there will be an extra weight of metal to take care of the excessive stretch across that portion of the shell, which, when the T is formed, extends between its extreme diagonal points. Furthermore, more or less thickness of metal may be left in the bottom of the shell so that the die $p$ will produce a T with a smooth surface.

It will be understood that I do not wish to limit myself to the use of hydraulic pressure, for whereas such pressure is sufficient for the fabrication of the ordinary commercial fitting, cases may arise necessitating pressure of too high intensity to be handled by valves. In such cases any other well known method for applying pressure may be substituted.

Having now fully described my invention, what I claim and desire to protect by Letters Patent is:

1. The process of manufacturing pipe fittings and similar articles which comprises inserting an open-ended tubular blank into an open ended cavity having an internal conformation corresponding to the external conformation of the blank or article to be formed, stopping the open end of the blank, and bodily displacing the blank in a direction toward the bottom of the cavity and expanding it against the walls of the cavity by applying to the blank an internal expanding pressure and simultaneously drawing the blank into the cavity through the open end thereof during the shaping of the article.

2. The process of manufacturing pipe fittings and similar articles which comprises assembling a plurality of die members forming between them an open ended cavity having an internal conformation corresponding to the external conformation of the blank or article to be formed, inserting an open ended tubular blank within the die cavity, stopping the open end of the blank, applying with the stopper an internal expanding force and a force adapted to bodily draw the blank into the die to expand it against the walls of the cavity and shorten the blank, and subsequently orificing the blanks.

3. The process of manufacturing pipe fittings and similar articles which comprises inserting a tubular blank, closed at one end and open at the other, partly within a cavity having an internal conformation approximating the external conformation of the article to be formed but with the angular parts thereof rounded to facilitate the flow of metal, stopping the open end of the blank, applying an internal expanding pressure adapted to shorten the blank and also expand it against the walls of the cavity, and by a separate operation compressing the article between dies adapted to compress and shape the rounded angular parts thereof.

4. The process of manufacturing pipe fittings and similar articles which comprises inserting a tubular blank, closed at one end and open at the other, partly within a cavity having a tubular mouth and an expanded body of greater internal dimension than that of the final article to be produced, stopping the open end of the blank, applying an internal expanding pressure adapted to shorten the blank and also expand it against the walls of the cavity and preventing the open end of the blank from misshaping during the expanding of the body, and by a separate operation compressing the article between dies adapted to reduce the internal dimensions of the article and shape it.

5. The process of manufacturing pipe T's, which comprises inserting an open ended tubular blank into an open ended bottle-shaped cavity, stopping the open end of the blank, applying an internal expanding pressure adapted to shorten the blank and also expand it against the walls of the cavity, forming two orifices in the walls of the blanks, and while internally supporting the blank applying external pressure to give it a T-shape.

6. The process of manufacturing pipe T's, which comprises inserting a tubular blank closed at one end and open at the other into the neck of a bottle-shaped cavity, stopping the open end of the tubular blank, applying an internal expanding pressure adapted to draw the blank into the cavity and also expand it against the walls thereof, forming in the wall of the blank two holes whose axes intersect, displacing the neck of the blank laterally to incline it in line with one of said holes and compressing the blank to shape.

7. The process of manufacturing pipe T's, which comprises inserting a tubular blank closed at one end and open at the other into the neck of a bottle-shaped cavity, stopping the open end of the tubular blank, applying an internal expanding pressure adapted to draw the blank into the cavity and also expand it against the walls thereof, forming in the wall of the blank two holes whose axes intersect, inserting a mandrel into the mouth of the blank, swinging the mandrel laterally to bring the neck into line with one of said holes, extending the mandrel into said hole, inserting another mandrel into the other hole, and externally compressing the blank against the mandrels.

8. The process of manufacturing hollow blanks having a tubular neck and an open mouth of smaller cross-sectional area than the body, comprising inserting a tubular blank through the open mouth of a shaping cavity, applying internal pressure to the blank to shape the body and draw the neck through the mouth of the shaping cavity during the expanding of the body to maintain the shape of the neck.

In testimony of which invention, I have hereunto set my hand at Philadelphia, Pa., on this 24th day of March, 1920.

KARL A. SODERSTROM.